(12) United States Patent
Niepceron et al.

(10) Patent No.: US 11,802,514 B2
(45) Date of Patent: Oct. 31, 2023

(54) EPICYCLIC REDUCTION GEAR FOR A TURBOMACHINE

(71) Applicant: SAFRAN TRANSMISSION SYSTEMS, Colombes (FR)

(72) Inventors: Clément Paul René Niepceron, Moissy-Cramayel (FR); Boris Pierre Marcel Morelli, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 48 days.

(21) Appl. No.: 17/625,876

(22) PCT Filed: Jul. 7, 2020

(86) PCT No.: PCT/FR2020/051204
§ 371 (c)(1),
(2) Date: Jan. 10, 2022

(87) PCT Pub. No.: WO2021/009436
PCT Pub. Date: Jan. 21, 2021

(65) Prior Publication Data
US 2022/0260021 A1    Aug. 18, 2022

(30) Foreign Application Priority Data

Jul. 16, 2019 (FR) ..................... 1908013

(51) Int. Cl.
*F02C 7/36* (2006.01)
*F02C 7/06* (2006.01)
(Continued)

(52) U.S. Cl.
CPC ............ *F02C 7/36* (2013.01); *F02C 7/06* (2013.01); *F05D 2220/323* (2013.01);
(Continued)

(58) Field of Classification Search
CPC combination set(s) only.
See application file for complete search history.

(56) References Cited

U.S. PATENT DOCUMENTS

| 4,887,424 A | 12/1989 | Geidel et al. |
| 11,054,039 B2 * | 7/2021 | Feinstein ............... F16C 35/08 |

(Continued)

FOREIGN PATENT DOCUMENTS

| FR | 2 566 085 A1 | 12/1985 |
| FR | 2 614 937 A1 | 11/1988 |

(Continued)

OTHER PUBLICATIONS

International Search Report dated Sep. 29, 2020, issued in corresponding International Application No. PCT/FR2020/051204 filed Jul. 7, 2020, 5 pages total.

(Continued)

*Primary Examiner* — Binh Q Tran
(74) *Attorney, Agent, or Firm* — CHRISTENSEN O'CONNOR JOHNSON KINDNESS PLLC

(57) ABSTRACT

An epicyclic reduction gear for a turbomachine includes a sun gear that is rotatable about a first axis and a ring gear surrounding the sun gear and also rotatable about the first axis. The ring gear is secured to a ring gear carrier that rotates a fan shaft. At least one planet gear is rotatable about a second axis and is meshed with the sun gear and the ring gear. The planet gear is guided in rotation about the second axis relative to a bearing of the planet carrier. A piece of equipment comprising a rotor. The piece of equipment is attached to the bearing of the planet carrier and has a rotor rotated by the ring gear carrier.

10 Claims, 4 Drawing Sheets

(51) Int. Cl.
  *F16H 57/08* (2006.01)
  *F16H 1/28* (2006.01)
  *F16H 57/021* (2012.01)
  *F16H 61/66* (2006.01)

(52) U.S. Cl.
  CPC .... *F05D 2220/76* (2013.01); *F05D 2220/766* (2013.01); *F05D 2240/50* (2013.01); *F05D 2240/52* (2013.01); *F05D 2240/54* (2013.01); *F05D 2250/36* (2013.01); *F05D 2260/403* (2013.01); *F05D 2260/40311* (2013.01); *F05D 2270/023* (2013.01); *F05D 2270/024* (2013.01); *F16H 1/2845* (2013.01); *F16H 57/021* (2013.01); *F16H 57/082* (2013.01); *F16H 2061/6602* (2013.01)

(56) References Cited

U.S. PATENT DOCUMENTS

| | | | | |
|---|---|---|---|---|
| 2016/0017752 A1* | 1/2016 | Coffin | ................... | F01D 25/162 475/331 |
| 2018/0023483 A1 | 1/2018 | Le Pache et al. | | |
| 2019/0039454 A1* | 2/2019 | Duong | ................... | F16D 13/24 |
| 2019/0085714 A1* | 3/2019 | Zatorski | ................ | B64D 27/10 |
| 2020/0072286 A1* | 3/2020 | Belcher | ................. | F16C 37/007 |
| 2020/0124139 A1* | 4/2020 | Harvey | ..................... | F16H 1/28 |
| 2020/0386188 A1* | 12/2020 | Kupratis | .................. | F02C 7/36 |

FOREIGN PATENT DOCUMENTS

| | | |
|---|---|---|
| FR | 2 980 546 A1 | 3/2013 |
| FR | 3 054 264 A1 | 1/2018 |
| GB | 2 160 291 A | 12/1985 |

OTHER PUBLICATIONS

Written Opinion dated Sep. 29, 2020, issued in corresponding International Application No. PCT/FR2020/051204 filed Jul. 7, 2020, 6 pages.

English translation of Written Opinion dated Sep. 29, 2020, issued in corresponding International Application No. PCT/FR2020/051204, filed Jul. 7, 2020, 6 pages.

International Preliminary Report on Patentability dated Jan. 18, 2022, issued in corresponding International Application No. PCT/FR2020/051204, filed Jul. 7, 2020, 7 pages.

* cited by examiner

EPICYCLIC REDUCTION GEAR FOR A TURBOMACHINE

FIELD OF THE DISCLOSURE

The present disclosure relates to a reduction gear, in particular an epicyclic reduction gear for a turbomachine, and to a turbomachine comprising such a reduction gear.

BACKGROUND

A turbomachine, such as a turbofan engine, typically comprises an air inlet comprising a ducted fan whose outlet air flow is divided into an air flow which enters a primary duct and forms a hot flow (or primary flow), and an air flow which flows into a secondary duct which extends around the primary duct and forms a cold flow (or secondary flow).

The turbomachine typically comprises, from upstream to downstream, in the direction of gas flow, at least one compressor, a combustion chamber, at least one turbine, and an ejection nozzle in which the combustion gases leaving the turbine (primary flow) are mixed with the secondary flow.

In the case of a turbomachine with reduction gear, a shaft of a turbine (hereinafter referred to as the turbine shaft) drives the shaft of the fan (hereinafter referred to as the fan shaft) by means of an epicyclic reduction gear. The reduction gear is usually located in an annular enclosure between the fan and the compressor, and allows to reduce the speed of rotation of the fan shaft relative to that of the turbine shaft.

As the name implies, an epicyclic reduction gear comprises an epicyclic gear train comprising at least one sun gear, one ring gear, one planet gear and one planet carrier. Depending on the requirements, such an epicyclic reduction gear can be configured in different ways.

In the following description, we will focus on the configuration commonly referred to as "planetary". More precisely, in such a configuration, the reduction gear has a sun gear secured to the turbine shaft, a ring gear secured to the fan shaft and an immobile (or fixed) planet carrier.

A turbomachine also classically comprises an accessory gearbox AGB, this AGB being generally disposed on a casing of the fan inside the nacelle. An AGB is designed to transmit a mechanical power drawn off from the engine of the turbomachine to items of equipment such as a pump, a starter-alternator, an air/oil separator, etc. Each item of equipment is fitted directly to the AGB.

It is known from the document FR-A1-3054264 in the name of the applicant to rotatably drive the rotor of an item of equipment via the sun gear of the reduction gear. Such an arrangement allows to move an item of equipment of the AGB into the enclosure in which the reduction gear is located, and thus to limit the space requirement of the AGB and consequently to reduce the dimensions of the nacelle. Such an arrangement may also allow for the addition of electrical or hydraulic item of equipment, so as to increase the available electrical or hydraulic power, without increasing the overall dimensions of the AGB.

However, such an arrangement is not compatible with all the turbomachine architectures since it requires a free space upstream of the sun gear (and more generally upstream of the reduction gear). Such a location is not available, for example, if the architecture of the turbomachine comprises a guiding for the turbine shaft in relation to the fan shaft upstream of the reduction gear.

The purpose of the present disclosure is thus to propose an epicyclic reduction gear provided with an item of equipment allowing the above-mentioned disadvantages to be remedied.

SUMMARY

The disclosure thus proposes an epicyclic reduction gear for a turbomachine comprising:
- a sun gear that is rotatable about a first axis A and adapted to be rotatably driven by a turbine of the turbomachine;
- a ring gear surrounding the sun gear and being rotatable about the first axis A, the ring gear being secured to a ring gear carrier adapted to rotatably drive a fan shaft;
- at least one planet gear that is rotatable about a second axis B, the planet gear being meshed with the sun gear and the ring gear;
- an immobile planet carrier, the planet gear being rotatably guided about the second axis B with respect to a bearing of the planet carrier;
- an item of equipment comprising a rotor;

characterised in that the item of equipment is fitted to the bearing of the planet carrier and the rotor of the item of equipment is rotatably driven by the ring gear carrier.

Such an arrangement of the item of equipment is compatible with more turbomachine architectures.

When the reduction gear comprises several planet gears, the ring gear carrier can rotatably drive one or more item of equipment for each of the planet gears, so as to limit the overall dimension of the AGB (and consequently reduce the dimensions of the nacelle) and/or increase the electrical and/or hydraulic power available.

The reduction gear according to the disclosure may comprise one or more of the following characteristics and/or steps, taken alone or in combination with each other:
- the rotor of the item of equipment is rotatably driven by the ring gear carrier via a gear train;
- the gear train comprises a spur gear between an inner toothing of the ring gear carrier and a toothed wheel with outer toothing, the toothed wheel being rotatable about a third axis C offset with respect to the first axis A and parallel to the first and second axes A, B, the toothed wheel being secured to a drive shaft that is rotatable about the third axis C, the rotor of the item of equipment being rotatably coupled with the drive shaft via coupling means;
- the toothed wheel is arranged in a space delimited by the ring gear carrier and the bearing;
- the drive shaft is rotatably guided within the bearing;
- the drive shaft is rotatably guided via at least one rolling bearing;
- the coupling means comprise domed teeth engaged in axial splines;
- the drive shaft is rotatably guided via two rolling bearings spaced apart from each other;
- the drive shaft comprises elastically deformable means arranged axially between the toothed wheel and the rolling bearing;
- the coupling means comprise straight teeth engaged in axial splines.

The present disclosure further relates to a turbomachine comprising a reduction gear as described above.

DESCRIPTION OF THE DRAWINGS

The disclosure will be better understood and other details, characteristics and advantages of the present disclosure will become clearer from the following description made by way of non-limiting example and with reference to the attached drawings, in which.

DETAILED DESCRIPTION

Figure 1:
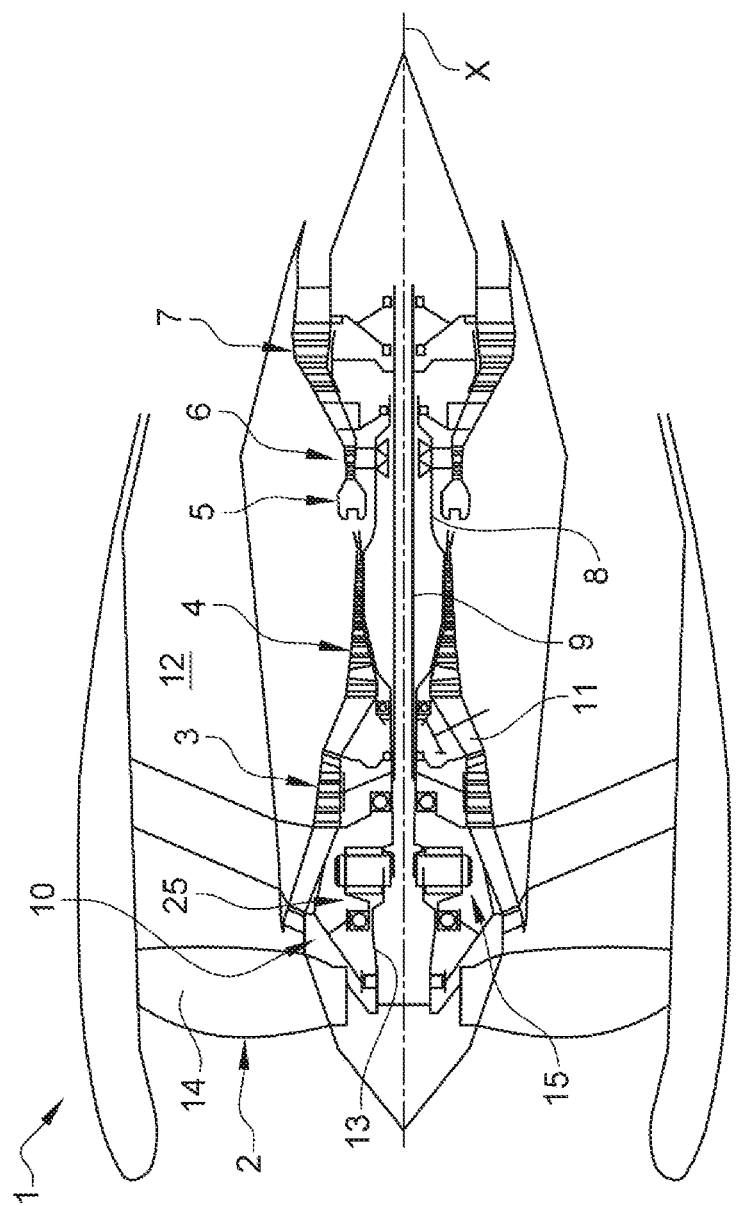
FIG. 1 is a schematic view in axial section of a turbomachine comprising a reduction gear according to the disclosure.

FIG. 1 shows a turbomachine 1 with a reduction gear, which conventionally comprises, from upstream to downstream, in the direction of gas flow, a ducted fan 2 and a low-pressure compressor 3, a high-pressure compressor 4, a combustion chamber 5, a high-pressure turbine 6 and a low-pressure turbine 7. The rotors of the high-pressure compressor 4 and the high-pressure turbine 6 are connected by a high-pressure shaft 8 and together they form a high-pressure (HP) spool. The rotors of the low-pressure compressor 3 and the low-pressure turbine 7 are connected by a low-pressure shaft 9 and together they form a low-pressure (LP) spool.

By convention, in this application, the terms "upstream" and "downstream" are defined in relation to the direction of gas flow in the turbomachine. "Axial" or "axially" means any direction parallel to the axis X of the turbomachine (axis of rotation of the high-pressure and low-pressure shafts), and "radial" or "radially" means any direction perpendicular to the axis X of the turbomachine. Also, by convention in the present application, the terms "internal", "external", "inner" and "outer" are defined radially with respect to the axis X of the turbomachine.

The air flow generated by the fan 2 is divided, by a flow-splitting nose of a fixed structure 10 of the turbomachine 1, into a primary air flow which enters a primary duct 11 and a secondary air flow which flows into a secondary duct 12 and participates in a preponderant manner in the thrust provided by the turbomachine 1.

The fan 2 comprises a shaft 13 (hereinafter referred to as the fan shaft 13) carrying blades 14 and rotatably driven by the low pressure shaft 9 via an epicyclic reduction gear 15. The fan shaft 13, the low pressure shaft 9 and the high pressure shaft 8 have a same axis of rotation which is coaxial with the axis X of the turbomachine 1.

According to the disclosure, the epicyclic reduction gear 15 comprises:
- a sun gear 16 that is rotatable about a first axis A and is adapted to be rotatably driven by a turbine (in this case a low pressure turbine 7) of the turbomachine 1;
- a ring gear 17 surrounding the sun gear 16 and that is rotatable about the first axis A, the ring gear 17 being secured to a ring gear carrier 18 adapted to rotatably drive the fan shaft 13;
- at least one planet gear 19 that is rotatable about a second axis B, the planet gear 19 being meshed with the sun gear 16 and the ring gear 17;
- an immobile (or fixed) planet carrier 20, the planet gear 19 being rotatably guided about the second axis B with respect to a bearing 35 of the planet carrier 20;
- an item of equipment 22 (or accessory) comprising a rotor 23.

The item of equipment 22 is fitted to the bearing 35 of the planet carrier 20 and the rotor 23 of the item of equipment 22 is rotatably driven by the ring gear carrier 18.

The epicyclic reduction gear 15 is thus of the "planetary" type. The reduction gear 15 allows the speed of rotation of the fan shaft 13 to be reduced relative to that of the low pressure shaft 9.

The item of equipment 22 comprises a rotor 23 and a stator 24. The item of equipment 22 is for example a pump, an alternator, etc.

As shown in the figures, more specifically, the reduction gear 15 is housed and lubricated in an annular enclosure 25 arranged between the fan 2 and the low pressure compressor 3.

The sun gear 16 is central and rotatably coupled with the low pressure shaft 9. The axis of rotation of the sun gear 16 (first axis A) is coaxial with the axis X of the turbomachine 1.

The ring gear 17 is flanged to a ring gear carrier 18 which is secured to the fan shaft 13. The ring gear carrier 18 comprises an envelope 26 (or web) flaring from an axial collar 27 (or neck) to a radial collar 28. The radial collar 28 of the ring gear carrier 18 is flanged to a collet 29 of the ring gear 17 via, for example, a plurality of bolts (not shown) evenly distributed about the axis A. The ring gear carrier 18 may be integrally formed with the fan shaft 13 or rotatably coupled to the fan shaft 13 via coupling means.

The reduction gear 15 comprises a plurality of planet gears 19 evenly distributed around the axis A between the sun gear 16 and the ring gear 17. Each planet gear 19 is jointly meshed with the sun gear 16 and the ring gear 17. Each planet gear 19 is traversed and rotatably guided about a second axis B with respect to a bearing 35 of the planet carrier 20. Here, the ring gear carrier 18 allows to rotatably drive a single piece of item of equipment 22 per planet gear 19, but it could drive several. Similarly, the ring gear carrier 18 may rotatably drive one or more item of equipment 22 for each of the planet gears 19.

The planet carrier 20 is secured to the fixed structure 10 of the turbomachine 1 and is generally in the form of a cage supporting the planet gears 19. The planet carrier 20 thus comprises a peripheral wall 30 edged by an upstream side wall 31 and a downstream side wall 32. The planet gears 19 are arranged between the side walls 31, 32 of the planet carrier 20. For each of the planet gears 19, the peripheral wall 30 comprises an opening 33, so as to allow the meshing between the planet gear 19 and the ring gear 17. The bearing 35 associated with each of the planet gears 19 is positioned and held in position relative to the side walls 31, 32 of the planet carrier 20. Each bearing 35 comprises a ring 21 and two annular rows of roller elements or rolling elements 34 (in this case cylindrical rollers) spaced from each other. The roller elements 34 of each of the rows are connected to the ring 21 of the bearing 35 of the planet carrier 20 and to the planet gear 19. The reduction gear 15 comprises means for conveying a liquid lubricant (not shown) to the roller elements 34. Advantageously, the conveying means are configured to convey liquid lubricant to the item of equipment 22.

According to the embodiments shown in the figures, the rotor 23 of the item of equipment 22 is rotatably driven by the ring gear carrier 18 via a gear train 36. The rotor of the item of equipment could for example be driven by the ring gear carrier via a key connection, a spline and serration connection, a shrink connection, etc.

A gear train allows to shift the rotation axis of the item of equipment rotor with respect to the rotation axis of the ring gear carrier (first axis A) and/or to modify the operating parameters of an item of equipment (rotation speed, torque, etc.).

A gear train has a defined transmission ratio so as to operate the item of equipment in the desired operating range.

According to the embodiments shown in the figures, the gear train 36 comprises a spur gear between an inner toothing 37 of the ring gear carrier 18 and an outer toothing toothed wheel 38. The toothed wheel 38 is rotatable about a third axis C offset related to the first axis A and parallel to the first and second axes A, B. The toothed wheel 38 is secured to a drive shaft 39 rotatable about the third axis C, the rotor 23 of the item of equipment 22 being rotatably coupled with the drive shaft 39 via coupling means 40.

More specifically, the inner toothing 37 of the ring gear carrier 18 extends around the first axis A. The inner toothing 37 of the ring gear carrier 18 is arranged in a space 41 delimited by the ring gear carrier 18 and the bearing 35 (or the planet carrier 20). The inner toothing 37 of the ring gear carrier 18 is integrally formed with the envelope 26 of the ring gear carrier 18 so as to form a one-piece ring gear carrier. The outer toothing toothed wheel 38 is cylindrical. The axis of rotation of the toothed wheel 38 (third axis C) is here coaxial with the axis of rotation of the planet gear 19 (second axis B) but it could be offset. The toothed wheel 38 is arranged in the space 41 delimited by the ring gear carrier 18 and the bearing 35 (or the planet carrier 20). More specifically, the toothed wheel 38 is arranged axially between the envelope 26 of the ring gear carrier 18 and the upstream side wall 31 of the planet carrier 20. The drive shaft 39 is integrally formed with the toothed wheel 38. According to the embodiments illustrated in the figures, the drive shaft 39 is rotatably guided via a bearing 42 fitted to the ring 21 of the bearing 35. The bearing 42 comprises a tubular body 43 and a base 44 positioned and held in position in an upstream counterbore of the ring 21. In other words, the bearing 42 is arranged on the side of the ring gear carrier 18. The tubular body 43 of the bearing 42 forms a housing for at least one rolling bearing 45, 46 required to guide the drive shaft 39.

According to the embodiments shown in the figures, the stator 24 of the item of equipment 22 is positioned and held in position in the ring 21 of the bearing 35 at the level of a downstream end. In other words, the stator 24 of the item of equipment 22 is arranged opposite the ring gear carrier 18. The axis of rotation of the rotor 23 of the item of equipment 22 (third axis C) is here coaxial with the axis of rotation of the planet gear 19 (second axis B), but it could be offset.

Figure 2:
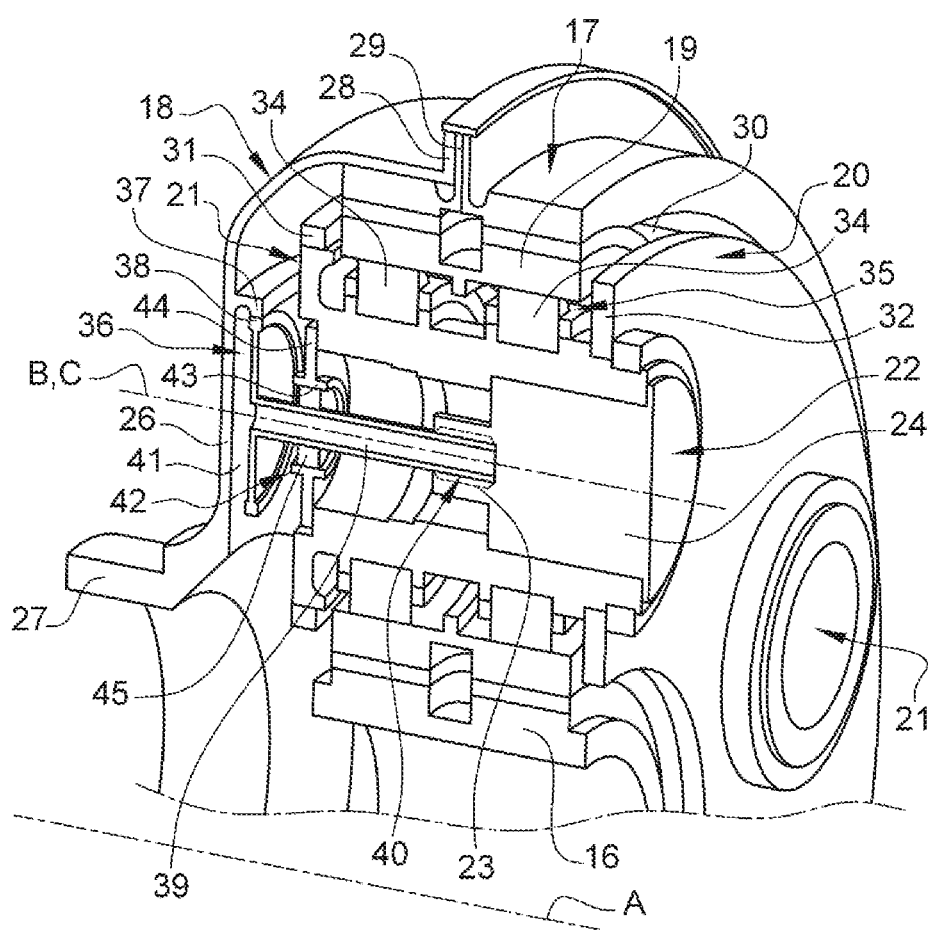
FIG. 2 is an axial half-section perspective view of a reduction gear according to a first embodiment.
Figure 3:
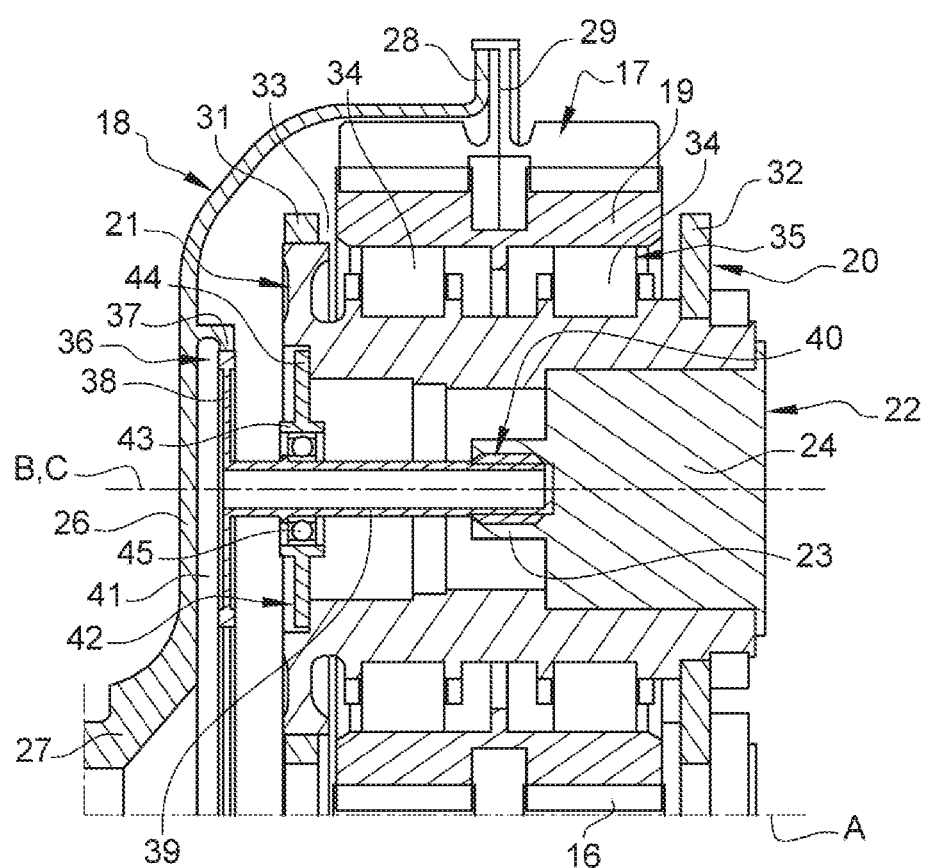
FIG. 3 is an axial half-section view of the reduction gear according to the first embodiment.

According to the first embodiment illustrated in FIGS. 2 and 3, the drive shaft 39 is rotatably guided with respect to the housing of the bearing 42 via a rolling bearing 45, the coupling means 40 having an angular deflection. Such coupling means 40 allow to compensate for existing misalignments between the toothed wheel 38 and the rotor 23 of the item of equipment 22. The coupling means 40 are, for example, coupling means with domed toothing, commonly referred to as "domed splines", comprising domed teeth (in other words teeth each having a convex domed profile in axial section) engaged in axial splines. The domed teeth are either made in the rotor of the item of equipment or in the drive shaft 39.

Advantageously, the rolling bearing 45 is a ball bearing.

Figure 4:
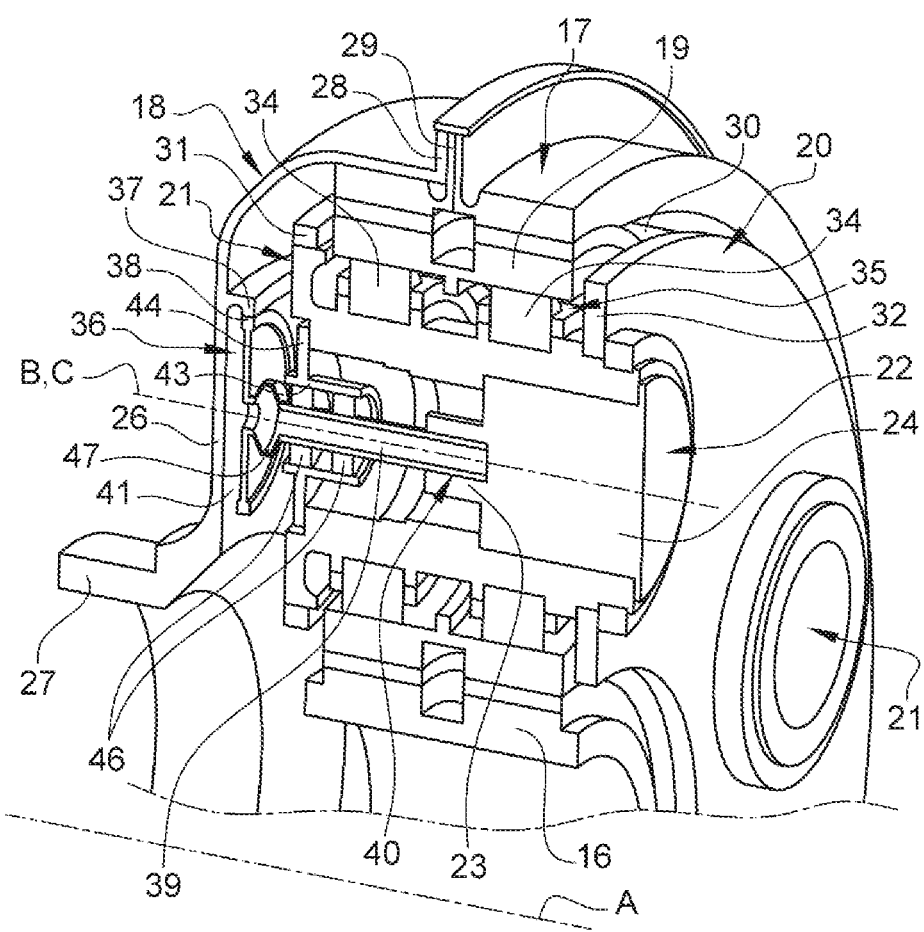
FIG. 4 is an axial half-section perspective view of a reduction gear according to a second embodiment.

According to the second embodiment illustrated in FIG. 4, the drive shaft 39 is rotatably guided with respect to the housing of the bearing 42 via two rolling bearings 46 spaced apart from each other, the drive shaft 39 comprising elastically deformable means 47 arranged axially between the toothed wheel 38 and the two rolling bearings 46.

Such elastically deformable means 47 allow to compensate for existing misalignments between the toothed wheel 38 and the rotor 23 of the item of equipment 22.

More specifically, the elastically deformable means 47 are here a bellow.

The elastically deformable means 47 could be a flexible coupling device known as a "flex coupling".

The bellows or the flex coupling devices provide a local flexibility to control any misalignments between the toothed wheel 38 and the inner toothing 37 of the ring gear carrier 18.

The coupling means 40 are, for example, straight toothing coupling means comprising straight teeth (and in other words teeth each having a straight profile in axial section) engaged in axial splines. The straight teeth are either made in the rotor of the item of equipment or in the drive shaft 39. Advantageously, the rolling bearings 46 are ball bearings.

The invention claimed is:

1. An epicyclic reduction gear for a turbomachine comprising:
    a sun gear that is rotatable about a first axis and adapted to be rotatably driven by a turbine of the turbomachine;
    a ring gear surrounding the sun gear and being rotatable about the first axis, the ring gear being secured to a ring gear carrier adapted to rotatably drive a fan shaft;
    at least one planet gear that is rotatable about a second axis, the planet gear being meshed with the sun gear and the ring gear;
    an immobile planet carrier, the planet gear being rotatably guided about the second axis with respect to a bearing of the planet carrier; and
    an item of equipment comprising a rotor,
    wherein the item of equipment is fitted to the bearing of the planet carrier, and the rotor of the item of equipment is rotatably driven by the ring gear carrier.

2. The reduction gear according to claim 1, wherein the rotor of the item of equipment is rotatably driven by the ring gear carrier via a gear train.

3. The reduction gear according to claim 2, wherein the gear train comprises a spur gear between an inner toothing of the ring gear carrier and a toothed wheel with outer toothing, the toothed wheel being rotatable about a third axis offset with respect to the first axis and parallel to the first and second axes, the toothed wheel being secured to a drive shaft that is rotatable about the third axis, the rotor of the item of equipment being rotatably coupled with the drive shaft via coupling means.

4. The reduction gear according to claim 3, wherein the toothed wheel is arranged in a space delimited by the ring gear carrier and the bearing.

5. The reduction gear according to claim 3, wherein the drive shaft is rotatably guided within the bearing.

6. The reduction gear according to claim 5, characterised in that the drive shaft is rotatably guided via at least one rolling bearing.

7. The reduction gear according to claim 6, wherein the coupling means comprise domed teeth engaged in axial splines.

8. The reduction gear according to claim 3, wherein the drive shaft is rotatably guided via two rolling bearings spaced apart from each other.

9. The reduction gear according to claim 8, wherein the drive shaft comprises elastically deformable means arranged axially between the toothed wheel and the rolling bearing.

10. A turbomachine comprising a reduction gear according to claim 1.

\* \* \* \* \*